SEARCH ROOM

[redacted]

1ul
T 856.010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection: reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 5, 1968

856 O.G. 5

~~645,300~~

CYANOETHYL POLYSILOXANE PLASTICIZED FLUOROELASTOMERS

Arthur Livingston Barney, Wilmington, Del., assignor to E. I. du Pont de Nemours and Company, Wilmington, Del., a corporation of Delaware

Filed June 12, 1967. Published Nov. 5, 1968
Class 260—29.1
No Drawing. 4 Pages Specification

A composition comprising a fluoroelastomer which is a copolymer of vinylidene fluoride and hexafluoropropene or a copolymer of vinylidene fluoride, hexafluoropropene, and tetrafluoroethylene and 10–40 parts by weight per 100 parts of fluoroelastomer of a fluid polysiloxane containing about 40–100 mole percent (cyanoethyl)methyl siloxane units and about 60–0 mole percent dimethylsiloxane units. The polysiloxane has a boiling point higher than about 300° C. at a pressure of 1 mm. Hg and an absolute viscosity not greater than 50,000 centipoises at 25° C.